United States Patent [19]

Ikegami

[11] Patent Number: 4,917,220

[45] Date of Patent: Apr. 17, 1990

[54] AUTOMATIC GAP CONTROL APPARATUS FOR A DISC BRAKE WITH A PARKING BRAKE

[75] Inventor: Hiroshi Ikegami, Saitama, Japan

[73] Assignee: Akebono Brake Industry Co., Ltd., Tokyo, Japan

[21] Appl. No.: 205,373

[22] Filed: Jun. 7, 1988

[30] Foreign Application Priority Data

Jun. 9, 1987 [JP] Japan .................................. 142287

[51] Int. Cl.$^4$ ............................................. F16D 65/56
[52] U.S. Cl. ................................ 188/196 D; 188/71.9; 192/111 A
[58] Field of Search .................. 188/71.8, 71.9, 196 D; 192/111 A; 92/13.6, 33

[56] References Cited

U.S. PATENT DOCUMENTS

| | | | |
|---|---|---|---|
| 3,610,373 | 10/1921 | Burnett | 188/196 D X |
| 3,900,084 | 8/1975 | Farr | 188/196 F |
| 4,246,985 | 1/1981 | Shimizu | 188/71.9 |
| 4,294,335 | 10/1981 | Maehara | 188/71.9 |
| 4,637,498 | 1/1987 | Thompson et al. | 188/71.9 |
| 4,660,684 | 4/1987 | Carre et al. | 188/71.9 |

FOREIGN PATENT DOCUMENTS 1434369  5/1976  United Kingdom .............. 188/71.9

Primary Examiner—George E. A. Halvosa
Attorney, Agent, or Firm—Cushman, Darby & Cushman

[57] ABSTRACT

An automatic gap control apparatus for a disc brake with a parking brake comprises a cup-shaped piston having a bottom, the piston is slidably mounted inside the brake operating cylinder, a rod having a through hole slidably fitted inside the body, which is prevented from rotating and provided with a one-way reversible thread, a sleeve nut having a concave portion at an end thereof, which is provided at a front end thereof an abutting portion abutting against the bottom of the piston and threadably engaged with the one-way reversible thread of the rod thereby forming a length adjusting mechanism, a small piston having a large diameter head, which is fitted in the through hole of the rod, and the large diameter head is fitted in the concave portion of the sleeve nut, and a spring member provided between the cup-shaped piston and the sleeve nut, which urges the sleeve nut. When the fluid pressure applied to the brake operating cylinder exceeds a predetermined value, the fluid pressure urges the large diameter head to bend the coil spring thereby preventing the sleeve nut from rotating relative to the rod.

4 Claims, 3 Drawing Sheets

AUTOMATIC GAP CONTROL APPARATUS FOR A DISC BRAKE WITH A PARKING BRAKE

BACKGROUND OF THE INVENTION

The present invention relates to an automatic gap control or adjusting apparatus accompanying an excess adjusting prevention mechanism in a disc brake accompanying a parking brake device.

A conventional automatic gap control or adjusting apparatus accompanying an excess adjusting prevention mechanism of this type is disclosed, for example, in U.S. Pat. No. 3,633,712 and British Patent No. 1434369. The former example, that is U.S. Pat. No. 3,633,712, will be described with reference to FIG. 1. Pistons 1 and 2 disposed opposite to each other are slidably mounted in an opening 4 of a main body member 3. In order to operate the brake, pressurised fluid is introduced between these pistons 1 and 2 to move them away from each other, an end face of the piston 1 actuates a directly operated pad 5. The piston 2 actuates an indirectly operated pad (not shown) through a yoke 6. A gap control mechanism is constituted by a rod 9 and a supplemental piston 8 slidably provided in an opening 7 of the piston 1, being threadably connected to each other by a reversible screw structure thereof. A sealing ring 10 is provided on the opening 7 of the piston 1 and to seal a gap between the supplemental piston 8 and the piston 1. A small bleed opening 11 is disposed at the left end wall of the piston 1. A normal braking gap is given by a backlash formed along the longitudinal direction of the screw 14. When the pad 5 is worn out, a gap is produced, corresponding to the worn out value, between a conical surface 12 of the piston 1 and another conical surface 13 of the supplemental piston 8. In this condition, if the pressurised fluid is introduced between the pistons 1 and 2 to perform the brake, the supplemental piston 8 first moves leftward by a distance of the backlash of the screw 14, while the supplemental piston 8 does not rotate. If the supplemental piston 8 further moves leftward by the fluid, the supplemental piston 8 rotates owing to an operation of the reversible screw 14, whereas the rod 9 is prevented from rotating by a ring 15. The conical surface 13 of the supplemental piston 8 abuts against the conical surface 12 of the piston 1. The supplemental piston 8 continues rotating until the friction force between both the conical surfaces 12 and 13 increases to prevent the supplemental piston 8 from rotating. The supplemental piston 8 moves leftwardly by an advanced distance of the screw 14 corresponding to the rotation value of the supplemental piston 8, thereby increasing the length by means of the length control mechanism and as a result the gap produced by the worn-out of the pad is adjusted. If a temporary increase in the braking gap is produced due to some bending of the members of the brake mechanism during a strong or sudden braking operation, the length control mechanism would not be operated. Namely, when such strong braking is applied to the mechanism, the supplemental piston 8, the rod 9, and the piston 1 are moved together to compress the spring 16. When the braking operation is released, hydraulic pressure applied to the piston 1 and the supplemental piston 8 is decreased, so that the piston 1, the supplemental piston 8, and the rod 9 are integrally returned rightwardly by elastic force of the spring 16 and, therefore, the backlash of the screw 14 forms a suitable braking gap. Since the supplemental piston 8 does not rotate by the reversible screw 14 while the brake operation is released, the increased length of the length control mechanism described above is left as it is, so that any unsuitable or excessive gap due to the worn-out of pad of the brake mechanism does not exist. As a result, the length control mechanism does not react to the temporary gap.

Next, the latter conventional mechanism, that is GB No. 1434369 will be described with reference to FIG. 2. This is a hydraulic operative type disc brake which is provided with a braking cylinder 21 disposed at a part of the brake main body 20 and a cup-shaped piston 22 which is slidably provided in the cylinder 21. Pressurised fluid is introduced into the cylinder 21 through an inlet 23 in order to actuate a brake operation and the piston 22 moves through an opening end of the cylinder 21 whereas a stem 24 is kept still. The sleeve 25 moves, together with the cup-shaped piston 22 until a backlash is taken up, which is between the screw portion of the sleeve 25 of the length control mechanism and the screw portion 26 of the stem 24, which are screw-threaded to each other. When the brake pad 30 is worn out and the brake operation is actuated, it is necessary to further move the piston 22. In this case, a circular truncated conical outer surface 27 of the sleeve 25 constituting a circular truncated conical clutch surface and the circular truncated conical inner surface 28 of the piston 22 are separated when hydraulic pressure is applied therebetween. In this condition, the sleeve 25 rotates, following the movement of the piston 22, around the stem 24 due to the axial elastic force of the compression coil spring 29. As a result, the length control mechanism increases the combined length of the stem 24 and the sleeve 25. When excessive fluid pressure is applied to the cylinder 21 of the brake mechanism for an emergent stop of the vehicle, the fluid pressure applied to the actuating piston 34 which is urged so as to slide outwardly of an opening having a step by an elastic force of a coil spring 33 through a large diameter portion 32 of the stem 24 exceeds the elastic force of the coil spring applied to the piston 34, thereby moving the actuating piston 34 towards to the interior side of the large diameter portion 32 of the stepped opening formed in the stem 24. Consequently, a cooperative action of the actuating piston 34 and a ramp surface 36 of a peg 35 pushes the latter outwardly of a radial direction through a hole 37 communicating with the large diameter portion 32 of the stem 24. Therefore, the peg 35 abuts against an interior of the thread of the sleeve 25 so as to lock the sleeve 25, thereby preventing the sleeve 25 from rotating relative to the stem 24. The length control mechanism doesn't operate and the piston 22 disadvantageously move apart from the sleeve 25 threadably connected to the stem 24. Thus, when the fluid pressure in the cylinder 21 exceeds the predetermined pressure as described above, the combined length of the stem 24 and the sleeve 25 cannot be automatically adjusted.

The above brake mechanism further includes a disc rotor 31 and a central opening 38 formed on a closed end wall of the brake main body 20, through which the stem 24 passes.

As described above in detail, according to the former automatic gap control apparatus of the hydraulic type brake actuator, that is U.S. Pat. No. 3,633,712, through hole 11 is disposed on the left end wall of the piston 1 having the opening 7, the circular truncated conical surface 12 is provided at the peripheral edge of the inlet of the opening 7 at the right end of the piston 1, the circular truncated conical surface 13 engaged with the circular truncated conical surface 12 is formed at the right end portion of the supplemental piston 8, the piston 8 is sealingly and slidably fitted into the opening, the length control mechanism is constituted by combining the supplemental piston 8 and the rod 9 which are engaged with each other by a reversible screw 14 having a suitable backlash in order to eliminate the gap due to the pad worn-out. As a result, the automatic gap control apparatus is adapted not to react to any temporary increase of the brake gap caused by the bending of some construction members of the brake mechanism as if an emergent heavy braking is actuated. In order to obtain the function above, it would be required to precisely finish the inner surface of the opening 7 of the piston 1 and also the outer surface of the supplemental piston 8, as well as to assemble finely the screw connecting mechanism of the supplemental piston 8 and the rod 9 so as to have a suitable backlash. It has been troublesome and expensive to manufacture these parts. According to the latter automatic gap control apparatus, that is GB No. 1434369, it has a vehicle brake operating cylinder which comprises the brake main body 20 having the cylinder 21 an end of which opens, the cup-shaped piston 22 slidably mounted in the cylinder 21 and moves through the open end of the cylinder 21 by means of an operation of a fluid pressure, and the gap eliminating mechanism for automatically adjusting the gap due to the worn-out of the brake pad 30 by means of the thread connection of the sleeve 25 abutting against a bottom of the cup-shaped piston 22 and the stem 24 extending into the cylinder 21 through the central opening 38 formed in the closed end wall of the brake main body 20 As if an excessive fluid pressure is introduced into the cylinder 21 of the brake in order to suddenly stop the vehicle and a temporary brake gap increases due to the bending of the brake constructing member, the temporary brake gap is absorbed with the following operation. That is, the stem 24 has the actuating piston 34 installed in the large diameter portion 32 of the stepped hole and urged to slide out of the stepped hole by means of the coil spring 33. When an excessive fluid pressure is applied to the actuating piston 34 against the elastic force of the coil spring 33 and the actuating piston 34 moves inwardly, the peg 35 movably mounted in the radially directed hole 37 of the stem 24 locks the stem 24 and the threaded sleeve 25 to prevent them from relatively rotating and prevent, therefore, the length of the length control mechanism from increasing. Such length control mechanism has a complicated structure and troublesome to manufacture, resulting in the expensive products.

SUMMARY OF THE INVENTION

It is an object of the present invention to provide an automatic gap control apparatus having an excessive adjusting prevention mechanism in a disc brake with a parking brake, which is simple in construction and easy to manufacture.

According to the apparatus of the invention, a cup-shaped piston 54 having its closed end is slidably mounted at the position of the open end of a cylinder for operating the brake installed in the vehicle brake main body. A rod has a one-way reversible screw which advances in an expansion direction, which is slidably installed in a hole disposed at the closed end wall of the brake operating cylinder. The rod is prevented from rotating. At the front end of the rod, a sleeve nut having a flange abutting against the bottom portion of the cup-shaped piston is engaged with a reversible screw of the rod. The rear portion of the flange is used, through a thrust bearing, by a compression coil spring connected to a ring approximate to the opening of the piston.

The front end of the flange of the sleeve nut urged by the spring abuts against the bottom of the cup-shaped piston. When a braking is actuated during a normal condition, the pressed fluid introduced into the cylinder moves the sleeve nut leftwards together with the piston until the gap between the threaded portion of the sleeve hut and the threaded portion of the rod 60 is taken up. When a gap is produced due to the worn-out of the brake pad and a brake is actuated, the sleeve nut first moves leftwards by a distance corresponding to the gap between the sleeve nut and the screw. When the piston 54 further moves leftwards, the sleeve nut moves apart from the piston, so that the sleeve nut rotates on the rod to follow the piston owing to an axial force of the spring. Thus, the rod and the sleeve nut are threadably joined in order to increase the length of the length control mechanism.

When a sudden braking is actuated and an excessive fluid pressure higher than the predetermined pressure makes the brake constituting members bend, a temporary brake gap is produced. However, in order to prevent the length of the length control mechanism from increasing, the sleeve nut rotates around the rod and the enlarged head portion of a small piston fitted into the large diameter portion of the stepped hole in the rod urges rightwardly of the front concave portion of the flange 70 of the sleeve nut. Namely, the excessive fluid pressure applied to the small piston urges the piston rightwardly thereby compressing the compression coil spring, so that a thread flank of the sleeve nut urges a flank of the rod. A non-reversible friction of these flanks prevents the sleeve nut from rotating, so that it is possible to obtain a simple mechanism enabling to prevent the length of the length control mechanism from increasing.

When fluid pressure is applied to a cylindrical space of the brake operating cylinder in order for the braking the vehicle during a normal running condition, the cup-shaped piston moves through the opening of the cylindrical space. The sleeve nut advances without rotating until the backlash between the one-way reversible screw of the rod and a screw of the sleeve nut is taken up while the rod is still. When there is a gap due to the worn-out of the brake pad, the cup-shaped piston further moves in order to eliminate the gap noted the sleeve nut moves bottom portion of the cup-shaped piston apart from the flange of the sleeve nut. The sleeve nut is apt to stay in a rear position of the cup-shaped piston. Since the length control mechanism is constructed by the sleeve nut and the rod, which are threadably engaged with each other by means of a one-way reversible screw, an axial elastic force of the compression coil spring urging the sleeve nut rotates it around the rod to follow the movement of the cup-shaped piston, thereby increasing the length of the length control mechanism composed of a thread connection of the rod and the sleeve nut. When the pressed fluid in the cylindrical space of the cylinder 53 is released, the cup-shaped piston 54 moves backwardly within the distance or range corresponding to the backlash of the threaded portions Therefore, the excessive movement or a stroke of the piston due to the worn-out of the brake pads is prevented during a parking brake operation. When emergent braking is applied and the excessive fluid pressure is introduced into the cylindrical space of the brake operating cylinder, the brake structuring members may bend thereby generating a temporary brake gap. As a result, the cup-shaped piston advances and, accordingly, the sleeve nut is ready for moving. The enlarged head portion of the small piston slidably fitted into the large diameter portion of the stepped hole of the rod is urged towards and connected bottom of the front concave of the flange of the sleeve nut due to the fluid pressure. It is preferable to present the backward force (P×A) obtained by multiplying the pressure (P) applied to the enlarged head portion and the area (A) of the small piston is higher than the elastic force (F) of the compressed coil spring (P×A>F). Even if the fluid pressure exceeds the predetermined value, the compression coil spring urging the sleeve nut is compressed by the small piston, thereby preventing the sleeve nut from advancing. The sleeve nut would not follow the advancing cup-shaped piston and, therefore, the brake constructing members bend due to the excessive pressure applied thereto, generating a temporary brake gap. However, the length of the length control mechanism consisting of the sleeve nut and the rod does not increase. As described above, the rod and the sleeve nut by means of an one-way reversible screw of expansion direction reversible is connected. In this connection, a useful length control function or mechanism is employed. That is, according to the length control mechanism, when an axial force is applied to the sleeve nut fitted to the threaded portion of the locked rod along the direction of its expansion relative to the rod, the sleeve nut rotates relative thereto and moves along the expansion direction of the sleeve nut. In contrast, when an axial force is applied to the sleeve nut along the opposite direction (contracting direction of the rod) nut relative to the rod, the sleeve nut doesn't rotate relative to the rod and as a result the sleeve nut doesn't move along its contracting direction.

PREFERRED EMBODIMENT OF THE INVENTION

Figure 1:
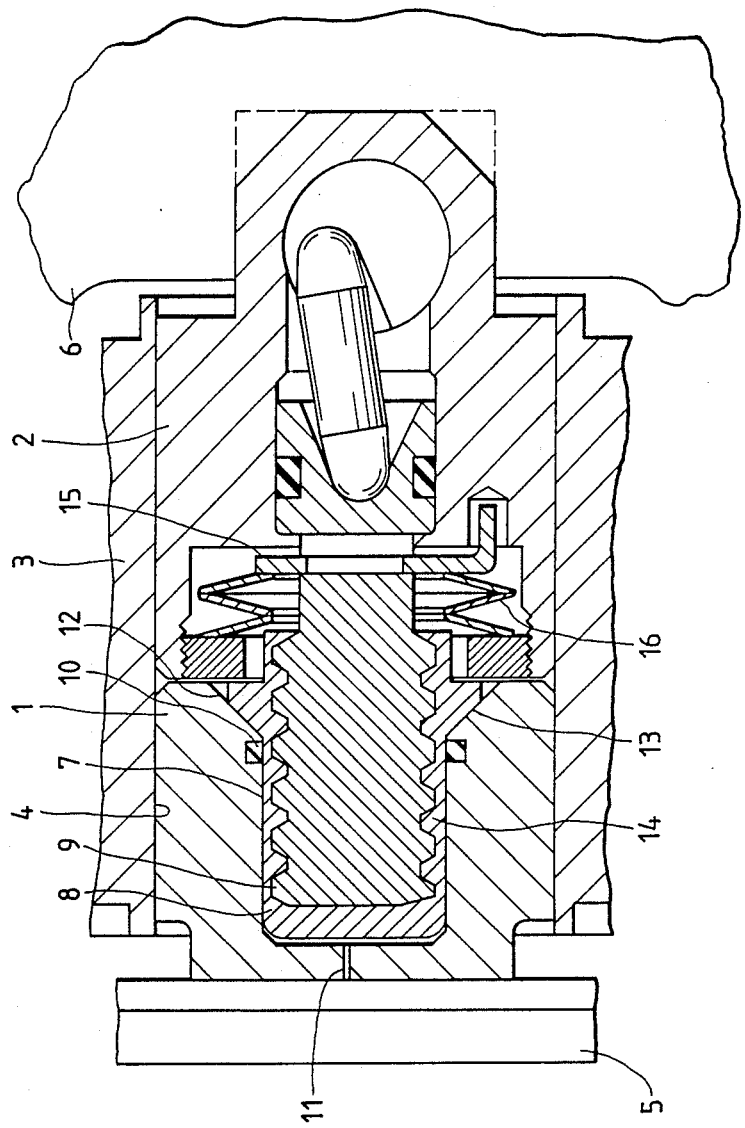
FIGS. 1 and 2 are cross-sectional views of the conventional disc brake main body provided with an automatic gap adjusting apparatus accompanying an excessive control prevention mechanism.
Figure 2:
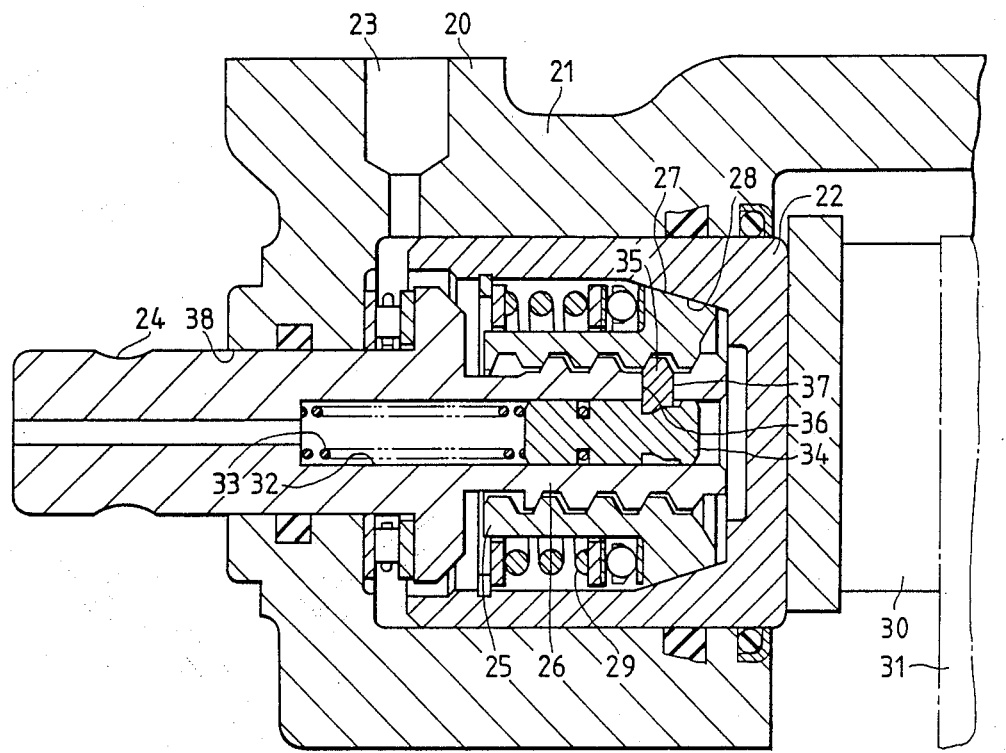
Figure 3:
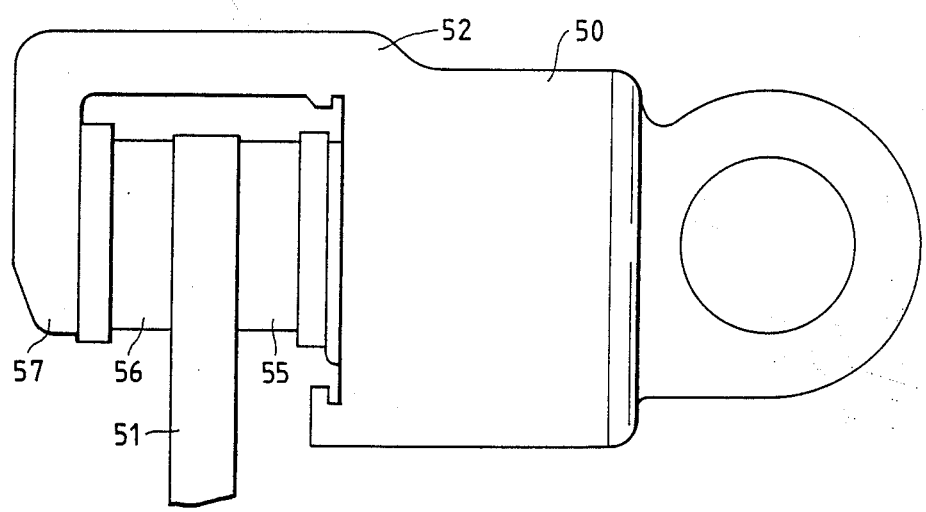
FIG. 3 is a side view of the disc brake according to the present invention.
Figure 4:
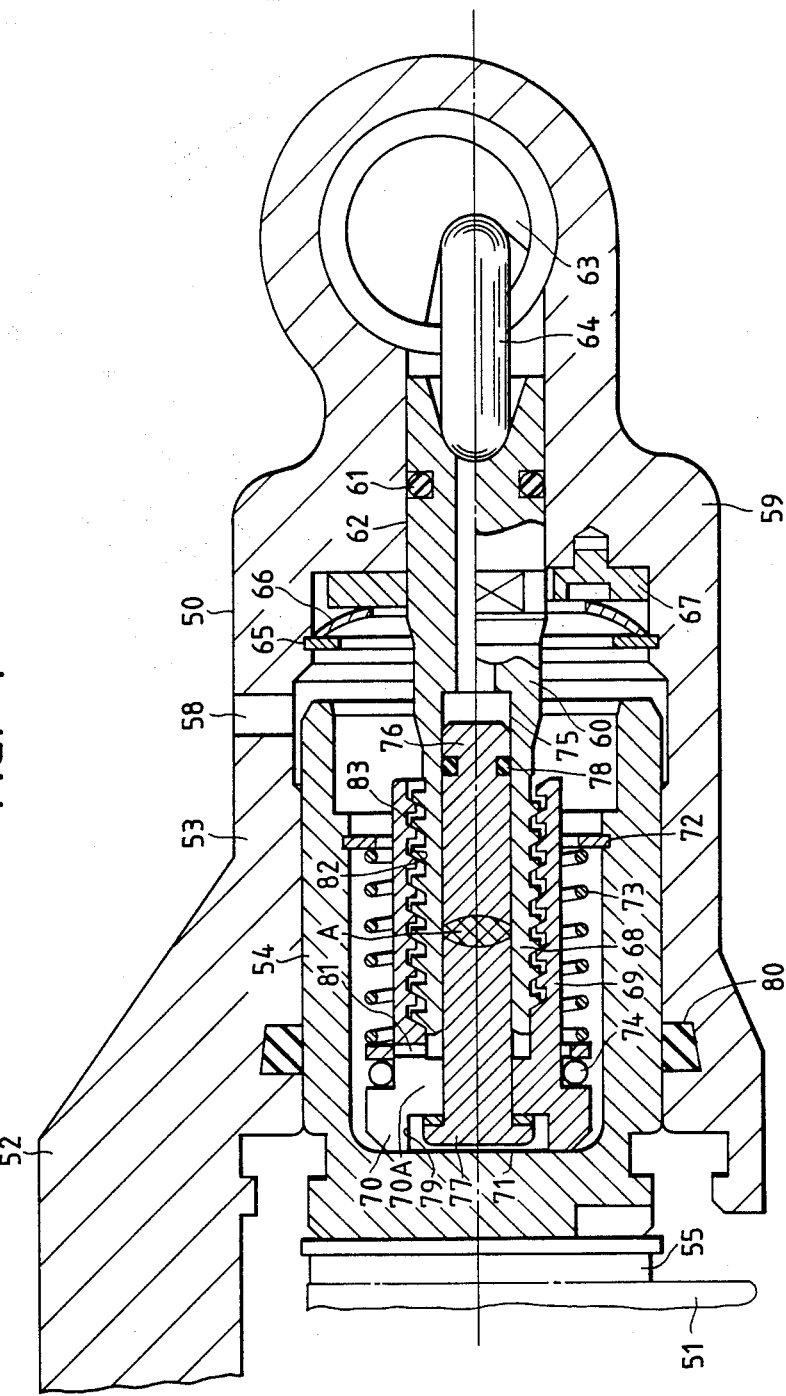
FIG. 4 is a traversed sectional view of the disc brake main body shown in FIG. 3.

The preferred embodiment of the present invention will be described with reference to the accompanying drawings. FIGS. 3 and 4 show an automatic gap control apparatus according to the invention. A brake main body 50 is slidably mounted on a stationary portion of a vehicle, such as an axle housing or a wheel attachment. A disc rotor 51 is mounted on a wheel hub rotatably fixed to the stationary portion of the vehicle. The brake main body 50 is positioned at an inner side of the disc rotor 51. The brake main body 50 has a bridge member 52 extending over the peripheral portion of the disc rotor 51. A brake operating cylinder 53 is disposed at the inner side of the disc rotor 51 and constitutes a part of the brake main body 50. The axis of the cylinder 53 is parallel to that of the disc rotor 51.

The brake operating cylinder 53 has an opening at an end thereof opposing to the disc rotor 51. A cup-shaped piston 54 is slidably fitted inside the cylinder 53 and has a closed end at the position of the opening of the cylinder 53. The piston 54 mounts a brake pad 55 on the inner side of the disc rotor 51. Another brake pad 56 is mounted at an outer side of the disc rotor 51 on an arm portion 57 extending toward the radially inside of the main body 50 from the bridge member 52. The brake operating cylinder 53 has an inlet 58 for pressuresed fluid and fluid of a suitable fluid pressure source is introduced into the cylinder space through the inlet 58, thereby urging the cup-shaped piston 54 apart from the closed end wall 59 of the cylinder 53 so that the brake pad 55 is pressed to the disc rotor 51.

The pressure fluid in the space of the cylinder 53 actuates to urge the closed end wall 59 of the cylinder 53, thereby pressing another brake pad 56 to the disc rotor 51 through the bridge member 52 of the brake main body 50. A rod 60, which has a sealing ring 61, constituting the mechanical parking brake is slidably fitted in a through hole 62 of the closed end wall 59 of the cylinder 53. The rod 60 is operatively connected at an outer end thereof to a cam 63 provided at the end portion of the brake main body 50 through a dolly 64. The cam 63 rotates around an axis extending perpendicular to the axis of the cylinder 53. A spring member 66 is supported on a snap ring 65 fixed on the cylindrical interior of the cylinder 53 approximate to the closed end wall 59 of the cylinder 53. The rod 60 is locked by a rotation prevention member 67 urged by the spring member 66. The rod 60 extends into the cylindrical space of the cylinder 53 and has a one-way reversible screw 68 which rotates reversibly in an expansion direction of the rod. The sleeve nut 69 having the female thread engages with the reversible screw 68 of the rod 60. The sleeve nut 69 and the reversible screw 68 constitutes a length control mechanical diminishing the gap due to the worn-out of the brake pad. The backlash is formed between the screw 68 of the rod 60 and the thread portion of the sleeve nut 69, by which a little axial relative movement is enabled without any relative rotation between the rod 60 and the sleeve nut 69. The sleeve nut 69 is provided at its end with a flange 70 abutting against a bottom 71 of the cup-shaped piston 54. The flange 70 of the sleeve nut 69 is urged toward the bottom portion 71 of the cup-shaped piston 54 through a thrust bearing 74 by an elastic force of a compression coil spring 73 connected to a snap ring 72 fixed to the cylindrical interior wall of the cup-shaped piston 54 at approximately to the open end thereof. When the flange 70 abuts against the bottom portion 71 of the piston 54, the sleeve nut 69 does not rotate relative to the piston 54. The rod 60 has a stepped hole provided with an enlarged diameter portion 75 opening towards the cylindrical space of the cylinder 53 and the stepped hole communicates with the atmosphere through a small diameter portion thereof. A small piston 76 provided with an enlarged head portion 77 is slidably mounted in the enlarged diameter hole portion of the stepped hole through a sealing ring 78. At the front end of the flange 70 of the sleeve nut 69, there is provided a concave portion 79 having a through hole through which the small piston 76 passes. The enlarged head portion of the small piston 76 is positioned within the concave portion 79. When the small piston 76 is urged rearwardly (rightward in the figure) by the fluid pressure introduced through an opening 70A of the flange 70, a rear face of the enlarged head portion 77 is pressed to the bottom of the concave portion 79 and fixed thereto. When the pressing force exceeds a predetermined value, the compression coil spring 73 is compressed and, therefore, a flank 82 of the sleeve nut 69 urges a flank 83 of the rod 60. In this condition, a friction between the flanks 82 and 83 of non-reversible prevents the sleeve nut 69 from rotating.

During braking the vehicle physically or mechanically such as the parking brake, for example, the cam 63 rotates to advance the rod 60 by means of the dolly 64, thereby advancing the sleeve nut 69 engaged with the rod 60 without rotation and urging the cup-shaped piston 54. Thus, a braking is actuated to the vehicle as shown in FIG. 4. The apparatus described above further includes an elastic sealing ring 80 for sealing between the cup-shaped piston 54 and the cylinder 53, and a communication hole 81 in the sleeve nut 69, which introduces the pressure fluid.

As described in detail above, the present invention provides an automatic gap control or adjustment apparatus having a length adjustment mechanism constructed by engaging a sleeve nut 69 with a one-way reversible screw which advances towards an expansion direction of an unrotatable rod. Using the automatic gap control apparatus, when a gap is caused by the worn-out of the brake pad, a thrust force along the expansion direction is applied to the sleeve nut 69 by fluid pressure generated by a brake actuation or brake operation and the sleeve nut 69 rotates relative to the rod 60. Thus, the length of the length control mechanism consisting of the rod 60 and the sleeve nut 69, increases and, accordingly, the gap is eliminated. When the brake constructing members are bent by an excessive fluid pressure due to a sudden braking, and a temporary brake gap is generated, the small piston 76 slidably fitted in the stepped hole of the rod 60 provided with the enlarged head portion 77, which engages with the concave portion 79 formed at the front end of the flange 70 of the sleeve nut 69 is urged rearwardly by the fluid pressure. As a result, the movement of the sleeve nut 69 due to the elastic force of the compressed coil spring 73 is prevented and the temporary or false brake gap generated by the bending of the brake structuring members is kept as it is. Therefore, the excessive control of the length control mechanism is prevented. The mechanism is structured by the operative connection of the rod 60 and the sleeve nut 69. Further, any drag of the brake mechanism would be eliminated while no brake is applied.

According to the present invention, the small piston 76 slidably fitted into the large diameter portion 75 of the stepped hole of the rod 60 which is provided with the enlarged head portion 77 engaged with the interior of the front concave portion 79 of the flange 70 of the sleeve nut 69 when an excessive fluid pressure exceeding the predetermined pressure is applied. As a result, the automatic gap adjusting apparatus of the present invention is more simple in construction than the conventional apparatus and also more economical in manufacturing since the apparatus has only two portions to precisely finish, that is, the outer peripheral surface of the small piston 76 and the inner peripheral surface of the rod 60 sliding with the small piston 76.

What is claimed is:

1. An automatic gap control apparatus for a disc brake with a parking brake, comprising:
    a brake main body having a brake operating cylinder;
    a cup-shaped piston having a bottom, said piston being slidably mounted inside said brake operating cylinder;
    a rod having a through hole slidably fitted inside said body, said rod being prevented from rotating, said rod being provided with a one-way reversible thread;
    a sleeve nut having a front end and a rear end, said sleeve nut having a concave portion at an end thereof and being provided at said front end with an abutting portion abutting against said bottom of said piston; said sleeve nut being threadably engaged with said one-way reversible thread of said rod so as to define a length adjusting mechanism, longitudinal movement of said sleeve nut rearwardly relative to said rod a predetermined amount frictionally locking said sleeve nut and said rod so that rotation of said sleeve nut relative to said rod is prevented while longitudinal movement of said rod with said sleeve nut locked thereto is possible;
    a small piston having a large diameter head, said small piston being fitted in said through hole of said rod, said large diameter head being fitted in said concave portion of said sleeve nut; and
    a spring member provided between said cup-shaped piston and said sleeve nut, said spring member urging said sleeve nut against said bottom of said cup-shaped piston,
    whereby when the fluid pressure applied to said brake operating cylinder exceeds a predetermined value, the fluid pressure causes said large diameter head to urge said sleeve nut rearwardly against said coil spring and relative to said rod to thereby frictionally lock said rod and said sleeve nut to prevent said sleeve nut from rotating relative to said rod.

2. The apparatus of claim 1, wherein said abutting portion of said sleeve nut is a flange.

3. The apparatus of claim 1, wherein said through hole of said rod is provided with at least one step.

4. The apparatus of claim 1, wherein said spring member is a compression coil spring.

* * * * *